(12) United States Patent
Koda

(10) Patent No.: US 6,179,158 B1
(45) Date of Patent: Jan. 30, 2001

(54) INJECTION STRETCH BLOW MOLDED WIDE MOUTHED CONTAINER FOR A PAINT CONTAINER AND THE LIKE

(75) Inventor: Hideaki Koda, Nagano-ken (JP)

(73) Assignee: A. K. Technical Laboratory, Inc., Nagano-Ken (JP)

(*) Notice: Under 35 U.S.C. 154(b), the term of this patent shall be extended for 0 days.

(21) Appl. No.: 09/355,184

(22) PCT Filed: Nov. 27, 1998

(86) PCT No.: PCT/JP98/05346

§ 371 Date: Aug. 3, 1999

§ 102(e) Date: Aug. 3, 1999

(87) PCT Pub. No.: WO99/28196

PCT Pub. Date: Jun. 10, 1999

(30) Foreign Application Priority Data

Nov. 28, 1997 (JP) .................................... 9/329070
Nov. 28, 1997 (JP) .................................... 9/329071

(51) Int. Cl.[7] .................................................. B65D 1/42
(52) U.S. Cl. ............................................. 220/659
(58) Field of Search ...................... 220/659, 658, 220/657, 656, 780, 782, 675; 206/509, 508

(56) References Cited

U.S. PATENT DOCUMENTS

| 3,529,743 | * | 9/1970 | Ehrbar et al. . | |
| 4,799,602 | * | 1/1989 | Collins et al. | 220/789 |
| 5,176,284 | * | 1/1993 | Sorensen . | |
| 5,180,076 | * | 1/1993 | Hundt . | |
| 5,964,372 | * | 10/1999 | Dubois et al. | 220/642 |
| 6,098,833 | * | 8/2000 | von Holdt, Sr. et al. | 220/659 |

FOREIGN PATENT DOCUMENTS

| 47-96602 | 8/1972 | (JP) . |
| 56-2133 | 6/1980 | (JP) . |
| 58-51974 | 4/1983 | (JP) . |
| 60-52410 | 4/1985 | (JP) . |
| 60-78777 | 5/1985 | (JP) . |
| 5-301500 | 4/1993 | (JP) . |

* cited by examiner

Primary Examiner—Stephen Castellano
(74) Attorney, Agent, or Firm—Weingarten, Schurgin, Gagnebin & Hayes LLP

(57) ABSTRACT

A wide mouthed container of synthetic resins for a paint, wax and the like, formed thinly in the body portion thereof by injection stretch blow molding is provided. A mouth portion of the wide mouthed container is of large diameter and comprises an internal wall integral with a body portion having a bottom, a belt shaped external wall integrally formed on the outside of the internal wall via a joint portion of required width to be in H-shape, and an upper and lower annular grooves between both the walls sectioned by the joint portion. The body portion is stretch blow molded thinly from the underside of the internal wall to a position where the lower edge of the external wall touches the body portion to form the side surface of the body portion on the same level as said external wall and to form the lower annular groove into a hollow in the lower part of the mouth portion. A plurality of ribs for preventing the deformation of the joint portion in stretching the body portion are integrally formed aslope onto a corner between the under surface of said joint portion at its external wall side and the inner surface of the external wall to provide a required number of the ribs in the lower annular groove at a regular interval.

8 Claims, 6 Drawing Sheets

INJECTION STRETCH BLOW MOLDED WIDE MOUTHED CONTAINER FOR A PAINT CONTAINER AND THE LIKE

TECHNICAL FIELD

The present invention relates to a wide mouthed container of synthetic resins for paint, wax and the like, formed thinly in the body portion thereof by injection stretch blow molding.

BACKGROUND ART

In a wide mouthed container for paint, wax and the like, a mouth portion thereof comprises an external wall and an internal wall that is formed to be lower than and on the inside of the external wall past an annular groove. A lid is fitted to an inner side surface of the mouth portion formed by the internal wall, and a rim of the lid is fitted to the inside of the external wall, so that the container is kept sealed. The lid can be easily removed by inserting a tip of a screwdriver and the like between the external wall and the rim of the lid, and pushing down a grip of the screwdriver supported at the external wall.

Conventionally, most of such wide mouthed containers with a double-walled mouth portion are made of metal, but those of synthetic resins are newly manufactured by employing the injection molding method, injection blow molding method and the like. However, such molded articles cannot be thinly formed in the body portion thereof, and are poor in strength as compared with those of metals, which gives rise to a problem in that they are easily broken when dropped.

Approaches to the problem are made in which paint containers and the like are manufactured by employing the injection stretch blow molding method that enables resins to be reinforced by biaxial stretching. A paint container disclosed in WO97/19801 is manufactured by the steps of: injection molding a preform consisting of a large-diameter mouth portion comprising a belt shaped external wall and an internal wall which is formed to be lower than and on the inside of the external wall via a joint portion past an annular groove, and a body portion having a bottom which is molded extending from the underside of the internal wall; transferring the preform to a blow mold for molding a paint container; and stretch blowing the preform below the body portion thereof from the underside of the internal wall.

In the disclosed injection stretch blow molding, the external and internal walls of the mouth portion cooled and solidified are held between a mouth forming mold and a core mold while heated portions below the body portion thereof is axially stretched. At almost the same time, the body portion is also air blown to a skirt portion which is projectingly formed on the underside of the external wall, so that the unstretched joint portion and an upside of the body portion which is blown and stretched into shoulder-shape are integrated.

In a paint container according to the ways described above, the body portion and bottom thereof are thin and biaxially oriented by the stretch blowing. Therefore, as compared to those manufactured by injection molding or injection blow molding, such a container is light in weight and improved in falling strength, and may be improved in gas barrier capability depending on the material resins.

However, in the stretch blowing according to the aforesaid prior art, no supporting part for the aforesaid joint portion is provided between the skirt portion and the internal wall; therefore, axial tensile stresses concentrate to the joint portion in stretch blowing, the joint portion is drawn downwardly from a corner of the skirt portion and deformed, and strains occur in the internal wall. This gives rise to a problem in that the molding accuracy is decreased in a mouth end edge and an inner surface of the internal wall which are to be a fitting edge and an inner side surface of the mouth portion, and thus the fit with the lid is deteriorated and the sealing capability lost.

As the span of the joint portion gets longer, the strains in the internal wall caused by the axial stretching come to the front. This can be improved by reducing the span, which, however, limits the radial expansion of the body portion. Thereby the body portion is formed thicker in the upper part thereof and thinner in the lower, resulting in unevenness of the wall thickness, which lowers the buckling strength of the body portion. In such cases, containers at the bottom may be deformed by load when a plurality of containers are piled up.

Like an injection blow molded paint container disclosed in the Japanese Patent Laid-Open Publication No. Sho 57-77439, ribs may be provided to support the joint portion. However, such ribs as described therein being formed across the external and internal walls cause a difference between ribbed and non-ribbed portions in stretched state. As a result, irregularity tends to be induced on the inner surface of the internal wall to which a lid is fitted.

Since touching to and located between the external and internal walls, the ribs take time to be cooled and solidified completely enough for bearing the tensile stress. On the other hand, the preform has to be released from the molds while the portions below the body portion still have a required amount of heat for stretch blowing. Therefore, the support by providing the ribs has not always been an effective approach for injection stretch blow molding.

Through the perpetual studies of the inventor of the present invention concerning the prevention of the aforesaid tensile deformation of the internal wall caused by the axial stretch, it has been found that even though ribs are employed for supporting the joint portion, conventional defects can be avoided depending on the way of forming ribs. That is, even in a wide mouthed container such as an injection stretch blow molded paint container, the inventor has found that it is possible to prevent the tensile deformation of the joint portion resulting from the stretching, as well as to avoid the convexo-concave deformation of the inner surface of the mouth portion caused by the conventional ribs and to finish the cooling and solidification of the ribs in a short period of time.

It is thus an object of the present invention to provide an injection stretch blow molded wide mouthed container of large diameter for a paint container and the like in which the problem of the strains in the internal wall resulting from the tensile deformation of the aforesaid joint portion is solved by the introduction of the reinforcing means using small ribs, and, despite of being made of synthetic resins, the body portion is formed thinly and is improved in falling strength because of the biaxial orientation.

In addition, the present invention is to provide an injection stretch blow molded wide mouthed container of large diameter for a paint container and the like in which the body portion and the external wall of the mouth portion are formed into side faces on the same level, like conventional paint tins and the like. By this means, even if the radial expansion of the body portion is limited, the employing of a preform of certain shape in cross-section allows the body portion to be molded without irregular in wall thickness, thereby enabling a plurality of the wide mouthed containers to be piled up.

Furthermore, the present invention is to provide an injection stretch blow molded wide mouthed container of large diameter for a paint container and the like in which a handle can be rotatably mounted across both sides of the mouth portion by utilizing the external wall, and the lid can be prevented from popping-out caused by a reaction in removing the lid, an increase in pressure inside the container, or the like.

DISCLOSURE OF THE INVENTION

The present invention according to the aforesaid objects is to provide a wide mouthed container, in which: a mouth portion of large diameter is composed of an internal wall integral with a body portion having a bottom, a belt shaped external wall integrally formed on the outside of the internal wall via a joint portion of required width to be in H-shape, and an upper and lower annular grooves between both the walls sectioned by the aforesaid joint portion; and the aforesaid body portion is stretch blow molded thinly from the underside of the internal wall to a position where the lower edge of the external wall touches the body portion to form the side surface of the body portion on the same level as the aforesaid external wall and to form the lower annular groove into a hollow in the lower part of the mouth portion, the wide mouthed container comprising a rib for preventing the deformation of the joint portion in stretching the body portion, integrally formed aslope onto a corner between the under surface of the aforesaid joint portion at its external wall side and the inner surface of the external wall, a required number of the ribs provided in the lower annular groove at a regular interval.

In such a configuration, even if axial tensile forces acting on the internal wall concentrate to the joint portion in stretch blowing, the joint portion holds so as to prevent the internal wall from being distorted downwardly by the tensile forces since the joint portion is supported by the aforesaid ribs at a regular interval. Therefore, the end edge of the internal wall suffers from no deformation, and keeps the same horizontal accuracy as in the injection molding. The ribs are located on the external wall side apart from the internal wall, which solves the problem that the existence of a rib causes a difference in stretched state of the internal wall and an irregularity occurs on the side surface of the internal wall to which a lid is fitted. In addition, the ribs are rapidly cooled and solidified along with the external wall, so that the mouth portion with the ribs will not take a long time to be cooled.

In addition, the present invention is provided in which the container is molded in such a manner that an injection molded preform comprising a mouth portion of large diameter composed of an internal wall integral with a body portion having a bottom, a belt shaped external wall integrally formed on the outside of the internal wall via a joint portion having a required width to be in H-shape, and an upper and lower annular grooves between both the walls sectioned by the aforesaid joint portion, is held at the aforesaid mouth portion provided by cooling and solidifying, and the aforesaid body portion is stretch blown to the same level as the aforesaid external wall while a portion from the underside of the aforesaid internal wall to the body portion is in high temperatures.

The aforesaid preform comprises the body portion extending from the aforesaid internal wall in which the body portion is composed of a thick-walled planiform stretch expanded portion of corn shape and a recess of required diameter formed at the center of the aforesaid preform by outwardly projecting a top portion of the stretch expanded portion, the bottom surface of the recess is formed to be nearly flat and thin, and the stretch expanded portion on the periphery of the recess is formed to curve inwardly.

In the preform, a top portion of a stretch rod is set into the aforesaid recess and expanded to press the bottom, so that the stretch expanded portion in heated state is stretched from a hem of the internal wall to be thinned. Therefore, a wide mouthed container with generally uniform thickness in the body portion can be obtained although the radial expansion of the body portion is limited to the position of the external wall.

The present invention is also provided in which mounting holes are formed at symmetrical positions on the external wall in the molding of the aforesaid preform, and fitting tabs projectingly provided on the inner sides of both end portions of a flexible corded handle are rotatably fitted and locked into the mounting holes respectively to mount the aforesaid handle across both sides of an opening portion. Here, the aforesaid fitting tabs are of tablet shape and comprise a semicircular locking block on the upside of the tip thereof, and the end portions of the handle and the fitting tabs comprise a slit extending from the lower end to the central portion thereof. The slits allow the end portions of the handle and the fitting tabs to be reduced in size to insert the fitting tabs along with the locking blocks into the aforesaid mounting holes rotatably, so that the aforesaid locking blocks are hooked and set inside the external wall.

Moreover, the present invention is provided in which a projection for latching is projectingly provided on a rim of a lid and is inserted into a fitting hole provided in a side surface of the external wall to close the lid, thereby preventing the lid from popping-out caused by a reaction in opening.

Furthermore, the present invention is provided in which a rim of a lid of synthetic resins is formed largely in diameter to extend over a mouth end edge of the external wall and is shaped into a fitting groove so that the lid can be fitted both to the inner surface of the internal wall and to the mouth end edge of the external wall, an engaging edge is formed on the outside of the mouth end edge of the external wall, and a secondary fitting provided between the engaging edge and an annular groove formed in the inside of the aforesaid fitting groove prevents the lid from self-opening resulting from a looseness of the fitting with the inner surface of the mouth portion caused by the internal pressure of the paint container. Here, an air vent is also provided in the aforesaid external wall for discharging gas leaked out on account of the loosened fit of the aforesaid lid with the inner surface of the mouth portion so as to reduce the inside volume of the paint container, so that the sealing resulting from the fit with the inner surface of the mouth portion is restored.

BEST MODE FOR CARRYING OUT THE INVENTION

Figure 1:
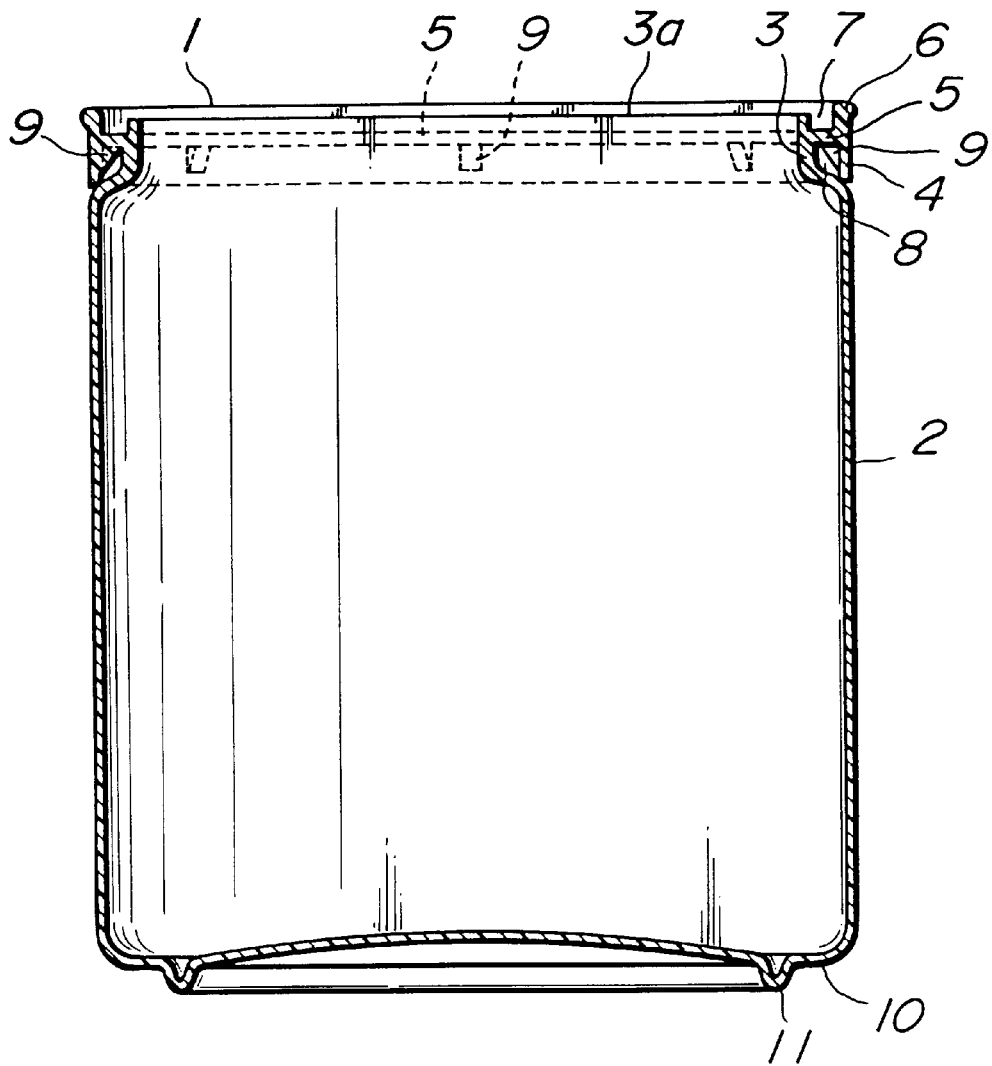
FIG. 1 is a longitudinal sectional view of a stretch blow molded wide mouthed container according to the present invention.

A wide mouthed container shown in FIG. 1 is a paint container molded of polyethylene terephthalate (PET). A large-diameter mouth portion 1 comprises an internal wall 3 integral with a body portion 2 having a bottom, a belt shaped external wall 4 integrally formed on the outside of the internal wall 3 via a joint portion 5 of required width to be in H-shape, and an upper and a lower annular grooves 7 and 8 between both the walls 3 and 4 sectioned by the joint portion 5. The external wall 4 is formed taller than the internal wall 3. A projection 6 is integrally molded on the outside of an end edge of the external wall 4.

The aforesaid body portion 2 is stretch blow molded thinly (about 0.5 mm) and vertically from the underside of the internal wall 3 to a portion where the side surface of the body portion 2 reaches to and becomes at the same level as the external wall 4. By this means, the lower annular groove 8 is formed into a hollow in the underside of the mouth portion 1, a pedestal 11 of a diameter smaller to some extent than the internal wall 4 is projectingly molded on a bottom portion 10 extending from the body portion 2, and thus the wide mouthed paint container is formed.

Designated by 9, 9 are ribs for supporting the joint portion 5, eight of which are provided in the aforesaid lower annular groove 8 at a regular interval in this embodiment. The ribs 9 are integrally formed aslope on corners between the under surface of the joint portion 5 on the external wall side and the inner surface of the external wall 4, apart from the internal wall 3, so as to prevent the deformation of the joint portion 5 in stretching the body portion.

Figure 2:
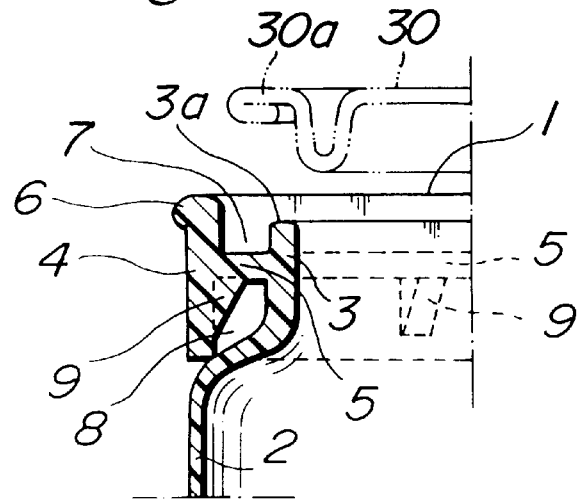
FIG. 2 is an enlarged sectional view of an essential portion of a stretch blow molded wide mouthed container according to the present invention.

In a paint container of such configuration, as shown in FIG. 2, a lid 30 is fitted into the inside of the internal wall 3 like well-known paint tins, and a rim 30a of the lid 30 is received by a mouth end edge 3a of the internal wall 3, so that the lid 30 is set inside the external wall 4.

Figure 3:
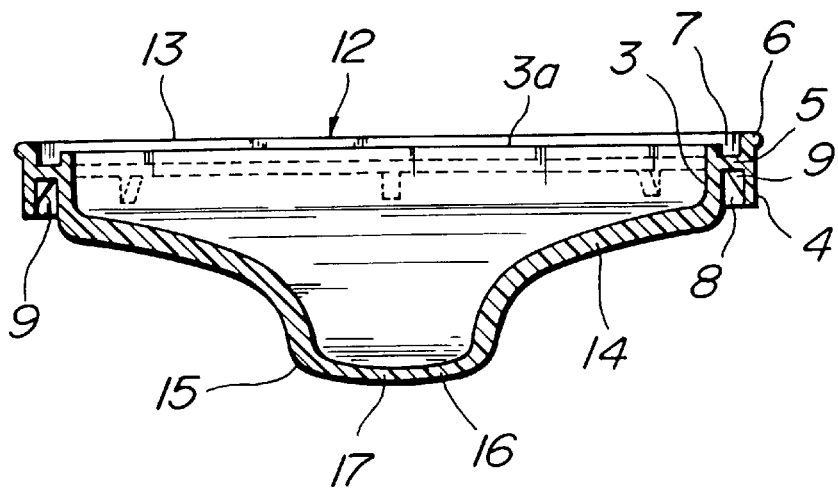
FIG. 3 is a longitudinal sectional view of a preform of a stretch blow molded wide mouthed container according to the present invention.
Figure 4:
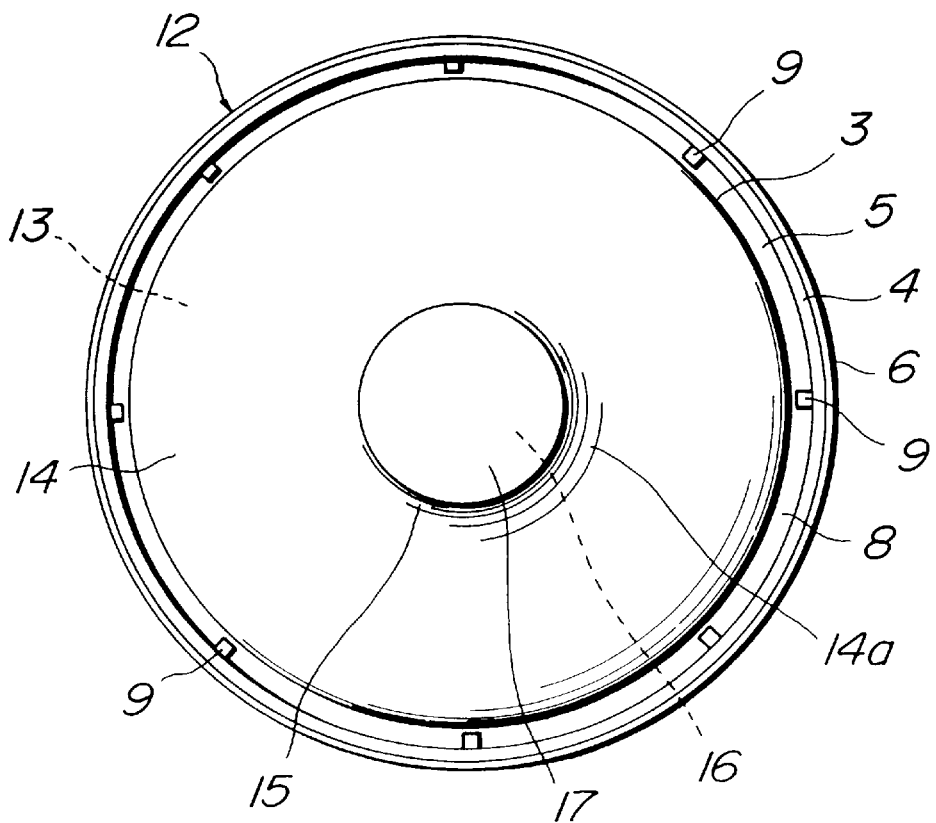
FIG. 4 is a bottom plan view of the preform.

FIG. 3 shows a preform 12 of the aforesaid paint container. The mouth portion 1 of the paint container is injection molded in advance as a mouth portion 13 of the preform 12 of the same structure along with a bottomed body portion of the preform 12 extending from the internal wall 3. The body portion of the preform is composed of a thick-walled planiform stretch expanded portion 14 of corn shape, and a recess 16 of required inner diameter formed at the center of the preform by projecting a top portion 15 of the stretch expanded portion outwardly. The recess 16 is formed to be thin and nearly flat at its bottom surface 17, and to curve inwardly at its stretch expanded portion 14a (see FIGS. 4 and 5) on the periphery of the recess 16.

Figure 5:
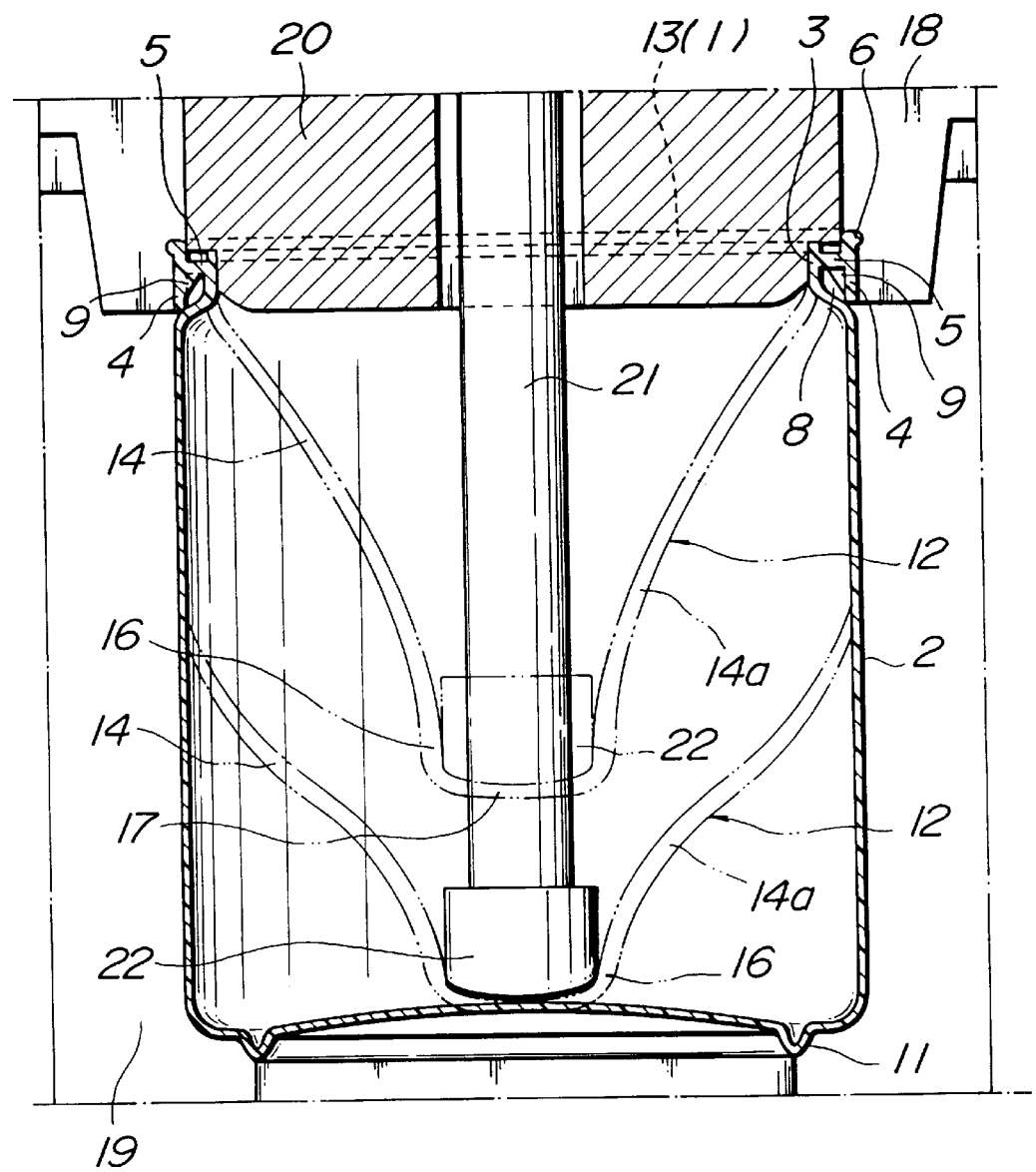
FIG. 5 is a sectional view of a preform of a stretch blow molded wide mouthed container according to the present invention in molding a paint container, where dashed lines show the preform under the stretch blowing.
Figure 6:
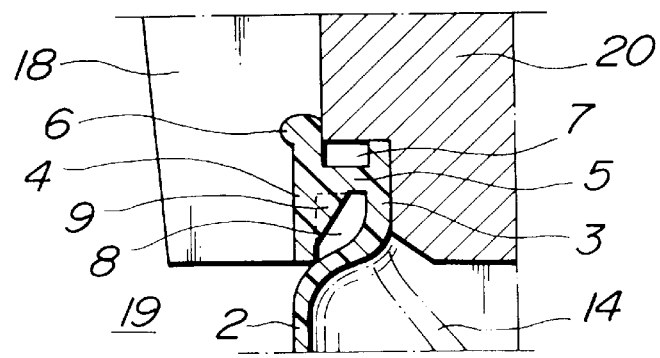
FIG. 6 is an enlarged partially sectional view of a mouth portion of a stretch blow molded wide mouthed container according to the present invention.

The preform 12 is released from an injection mold while portions from the underside of the internal wall 3 to the stretch expanded portion 14 are still in heated state. Up to this time, the mouth portion 13 of the preform is cooled and solidified. Accordingly, as shown in FIG. 5, with the mouth portion 13 held at its outside with a mouth forming mold 18 used in the injection molding, the preform is transferred to a blow mold 19 before a blow core 20 is fitted to the internal wall 4. Here, with the previously solidified mouth portion 13 of the preform held between the blow core 20 and the mouth forming mold 18, the preform is stretch blow molded into a wide mouthed container.

The stretch blow molding is performed in such a manner that: a top portion 22 of a stretch rod 21 equipped in the blow core 20 is set into the recess 16; the center portion of the preform is pressed downwardly with the stretch rod 21 so as to extend the body portion of the preform axially from the underside of the internal wall 3; and, almost at the same time, the stretch expanded portion 14 is expanded radially by air blowing.

In the preform 12, an upper part of the stretch expanded portion 14 is stretched to be slightly thinner by the expansion of the aforesaid stretch rod 21. The thinning of the wall lowers the temperature of the part, so that the stretch is shifted to an unstretched portion below. After this manner, the expanded portion 14a on the periphery of the recess 16 curving inward is stretched, and the body portion of the preform is changing into an elongated truncated corn shape. Here, the distance of the body portion of the preform from a cavity surface of the blow mold 19 increases as approaching to the bottom, which makes a difference in radial stretch ratio at the upper and lower parts. However, the difference is cancelled to some extent by the wall thickness, so that the body portion 2 of the paint container is prevented from the unevenness in wall thickness.

Accordingly, even in a paint container that tends to be limited in radial stretch expansion more tightly and formed thicker in upper parts, the body portion 2 expanded and formed thinly from the internal wall 3 to a portion where to meet with he under edge of the external wall 4 is evened in wall thickness distribution and improved in buckling strength.

The stretch blow molding may be favorably performed before the surface temperature of the stretch expanded portion 14 in heated state reaches its peak temperature by the internal heat.

Moreover, in the axial stretch by the stretch rod 21, the mouth portion 13 of the preform is previously solidified and is held between the mouth forming mold 18 and the blow core 20. On the other hand, the internal wall 3 is held only at one side against the blow core 20, merely by flat contact, differing from the external wall 4 which is held by the fitting of a projecting edge 6. Therefore, the downward tensile force causes a slip in the internal wall 3, resulting in the concentration of stresses to the aforesaid joint portion 5.

However, the tensile stresses are partially dispersed to the external wall 4 via the aforesaid ribs 9, 9 formed on the corners between the joint portion 5 and the external wall 4. The ribs 9, 9 also enable the joint portion 5 to resist against the tensile force. As a result, the strain in the internal wall 3 caused by the joint portion 5 is deterred, the inner surface of the mouth portion formed of the internal wall 3 and the mouth end edge 3a of the stretch blow molded paint container are prevented from deformation, and the shape and the horizontal accuracy thereof are kept assured as in the previous injection molding.

Furthermore, being provided in the lower annular groove 8, the ribs 9, 9 for preventing the deformation differ from well-known ribs formed across the internal and external walls 3 and 4 in that they are easily cooled along with the external wall 4 because of being isolated from the internal wall 3. In addition, the ribs cause no irregular deformation of the inner surface since they are not in touch with the internal wall 3.

Moreover, the lower annular groove 8 of the joint portion 5 is left closed with the blow molded body portion 2 to form a hollow after the molding. However, the aforesaid ribs 9, 9 in the hollow reinforce the external wall 4 against external force, so that the strain in the external wall 4 by external force is deterred, and the mouth portion 1 is also prevented from the deformation by external force.

Accordingly, even though the wide mouthed container is of stretch blow molded synthetic resins, no disorder occurs in molding accuracy of the injection molded mouth portion, so that a lid is freely fitted and a poor sealing hardly occurs. In addition, the biaxial orientation of the body portion improves impact strength and gas barrier property, thereby enhancing its application for a wide mouthed container for a paint and the like in which color of content is distinguishable from the outside. Furthermore, wide mouthed containers of the same configuration can be manufactured from various synthetic resins as long as the resins are available for stretch blow molding, and thus be widely applied to wide mouthed containers for volatile content.

FIGS. 7 to 10 show a case where a handle 23 is mounted to a paint container by utilizing the aforesaid external wall 4. In molding the aforesaid preform 12, mounting holes 24, 24 are formed at symmetrical positions on the external wall 4 by using projecting portions (not shown) provided in the mouth forming mold 18 of split molds. Fitting tabs 25, 25 projectingly provided on the inner sides of both end portions of the corded handle 23 of flexible synthetic resins (polypropylene, for example) are rotatably fitted and locked into the mounting holes 24, 24, respectively.

The aforesaid fitting tabs 25, 25 are of tablet shape and have a semicircular locking block 26 on the upside of the tips thereof, respectively. The end portions of the handle and the fitting tabs 25 have a slit 27 extending from their lower end to the center. The slits 27 enable the fitting tabs 25 along with the end portions of the handle to be pressed and reduced in size so that the locking blocks 26 can be upwardly slantly inserted into the mounting holes 24. In this manner, the locking blocks 26 are set in the aforesaid lower annular groove 8 forming a hollow, and are retained inside the external wall 4. Note that provided concavely in the peripheral surface of the external wall 4 is a retention groove 28 for use in the stretch blowing.

Figure 7:
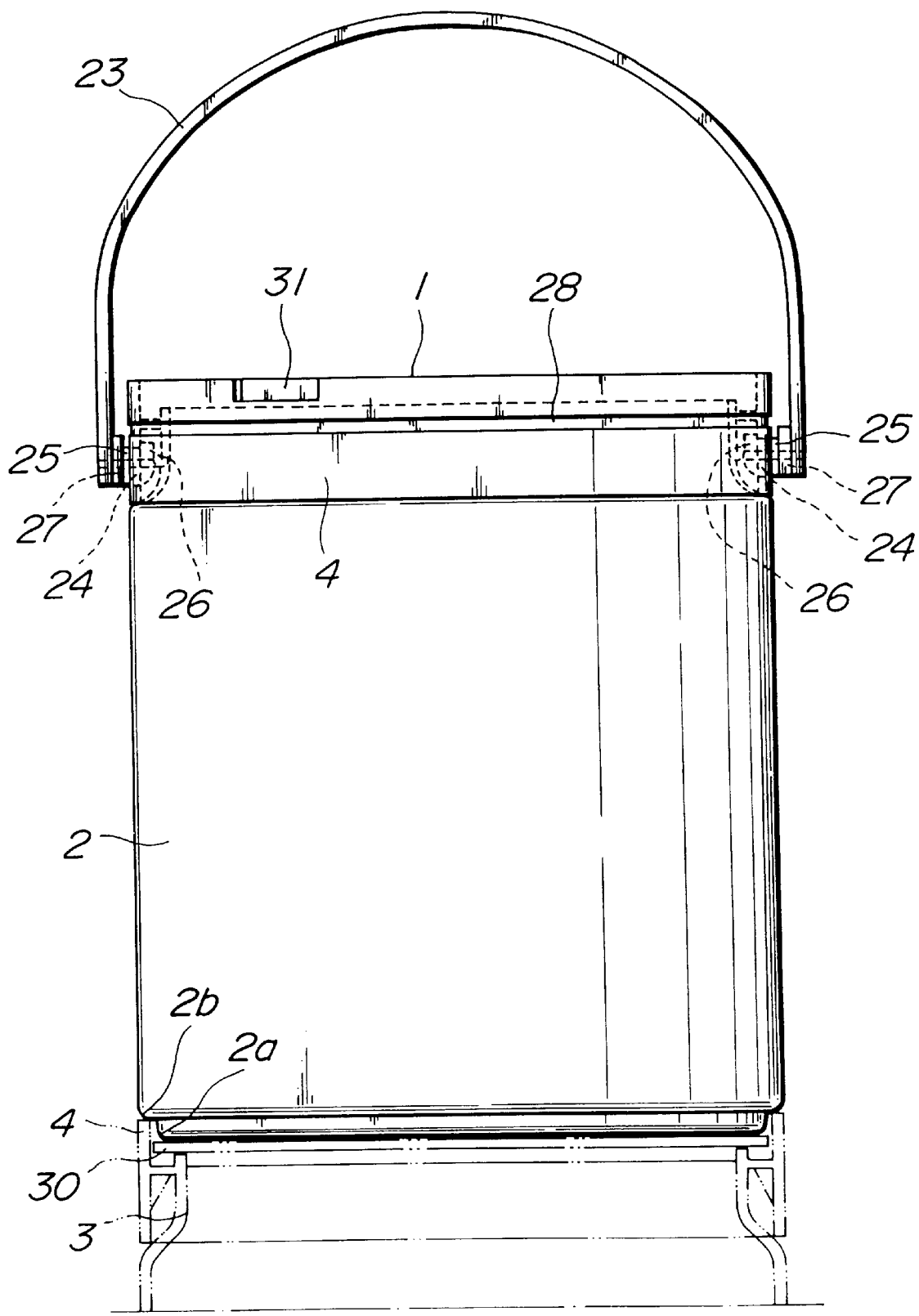
FIG. 7 is a front view of a paint container with a handle according to the present invention, where dashed lines show the piled state thereof.
Figure 8:
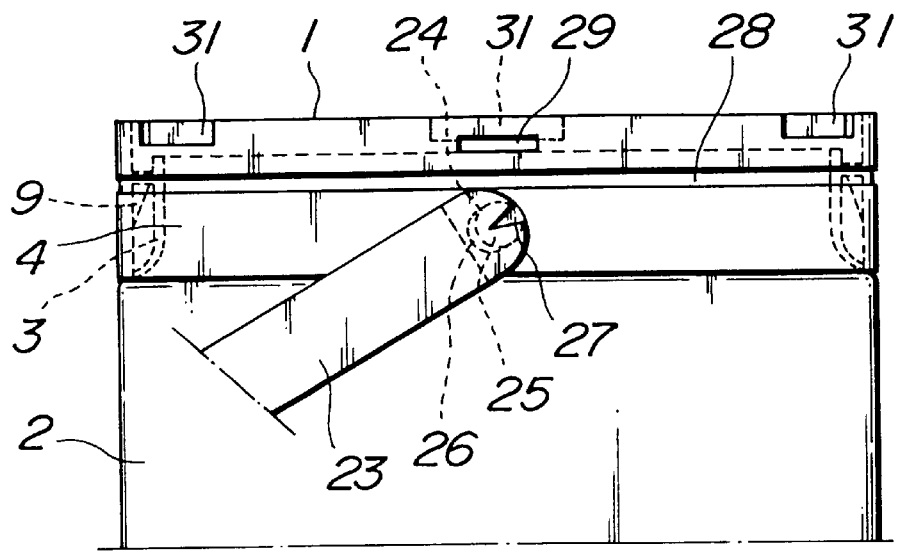
FIG. 8 is a side view of a paint container with a handle according to the present invention.

The. bottom of the paint container may be formed into a step portion 2a in the periphery thereof, as shown in FIG. 7, in stead of the aforesaid pedestal 11. Here, the step portion 2a is provided with an outer diameter smaller to some extent than the inner diameter of the external wall 4 so as to be set inside the external wall 4, and a bottom periphery 2b is provided with a proper height so as to ride on the mouth end edge of the external wall 4. By this means, when a plurality of the paint containers are piled up as shown in FIG. 7, respective loads thereof hold down the lids 30 of the paint containers below. Furthermore, even if the loads cause the distortion in the body portions, the external walls 4 can provide a support against falling down.

Figure 10:
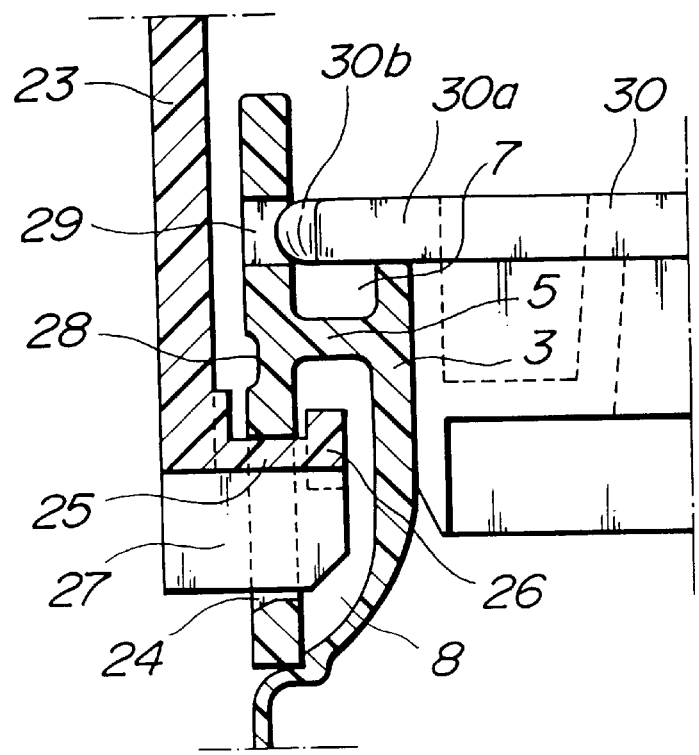
FIG. 10 is a partially longitudinal sectional view of a mouth portion showing the mounting state of a handle and the fitting state of a lid at its rim according to the present invention.

In FIG. 10, a projection 30b for locking is projectingly provided on a rim 30a of the aforesaid lid 30 of synthetic resins, and a fitting hole 29 for fitting the projection 30b is provided in the side surface of the external wall 4. The lid 30 is closed with the projection 30b inserted into the fitting hole 29, and is opened by being unclenched at the opposite side to the projection 30b. This prevents the lid 30 from popping-out caused by a reaction in opening.

Figure 9:
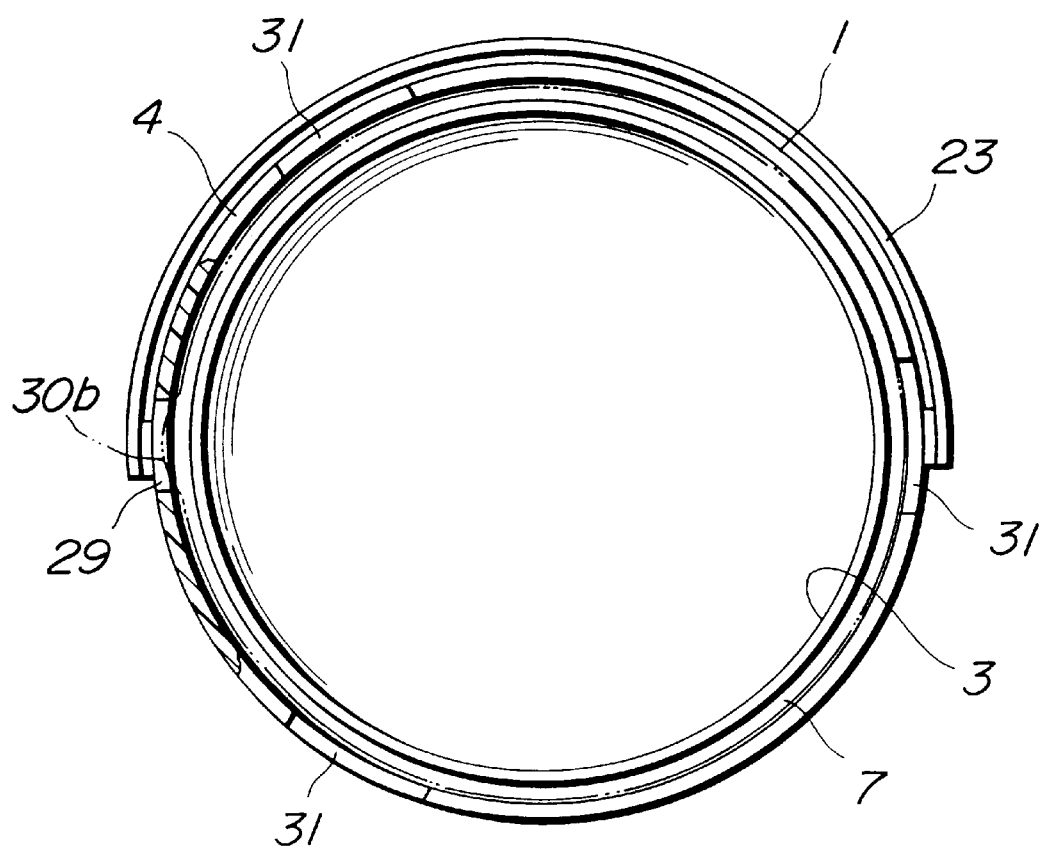
FIG. 9 is a partially cutaway plan view of a paint container with a handle according to the present invention.

In such a configuration, the external wall 4 is molded higher than the internal wall 3 by the width of the fitting hole 29, and the lid cannot be opened with a screwdriver and the like by using the mouth end edge of the external wall 4 as the fulcrum. Therefore, a notch 31 for lid opening is formed in the edge opposite the fitting hole 29, as shown in FIG. 9. The notch 31 is not limited to the aforementioned position, and a plurality thereof may be provided.

Figure 11:
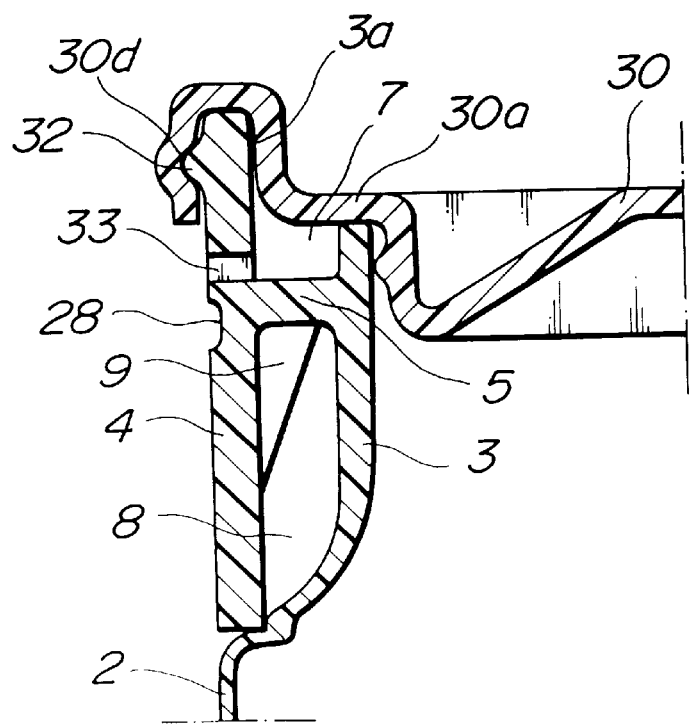
FIG. 11 is a partially longitudinal sectional view of a mouth portion with a lid having fitting means to a mouth end edge of an external wall.

In FIG. 11, the lid 30 of synthetic resins is provided in which the rim 30a thereof is formed largely in diameter to extend over a mouth end edge of the external wall 4 and is shaped into a fitting groove 30c so that the lid can be fitted both to the inner surface of the internal wall 3 and to the mouth end edge of the external wall 4. An engaging edge 32 is formed on the outside of the mouth end edge of the external wall 4. In a case where an evaporated solvent resulting from hot air and the like causes a rise in the internal pressure of the paint container and loosens the fit of the lid to the inner surface of the mouth portion, the lid 30 may open by itself. However, a fit between the rim 30a and the mouth end edge of the external wall 4 utilizing a secondary fit provided between the aforesaid engaging edge 32 and an annular groove 30d formed in the inside of said fitting groove 30c prevents the lid 30 from opening and popping-out.

In addition, an air vent 33 is provided in the external wall 4 so that, when an increase in the internal pressure loosens the fit with the inner surface of the mouth portion and causes the evaporated gas to leak out, the air vent 33 discharges the gas and reduces the internal pressure to restore the seal resulting from the fit with the inner surface of the mouth portion.

INDUSTRIAL APPLICABILITY

As described above, in an injection stretch blow molded wide mouthed container of large diameter for a paint container and the like according to the present invention, a solution to the strains and the like in the internal wall resulting from the tensile deformation of the aforesaid joint portion is provided by the introduction of the reinforcing means using small ribs. In addition, the body portion is formed thinly and is improved in falling strength because of the biaxial orientation.

Moreover, in the wide mouthed container according to the present invention, the employing of a preform of certain shape in cross-section enables the body portion to be molded without irregular in wall thickness, and thereby enabling a plurality of the wide mouthed containers to be piled up.

Furthermore, in the wide mouthed container according to the present invention, a handle can be rotatably mounted across both sides of the mouth portion by utilizing the external wall. Besides, the lid can be prevented from popping-out caused by a reaction in removing the lid, an increase in pressure inside the container or the like.

What is claimed is:

1. An injection stretch blow molded wide mouthed container for a paint container and the like wherein a mouth portion of large diameter thereof comprises an internal wall integral with a body portion having a bottom, a belt shaped external wall integrally formed on the outside of the internal wall via a joint portion of required width to be in H-shape, and an upper and lower annular grooves between both the walls sectioned by said joint portion, and said body portion is stretch blow molded thinly from the underside of the internal wall to a position where the lower edge of the external wall touches the body portion to form the side surface of the body portion on the same level as said external wall and to form the lower annular groove into a hollow in the lower part of the mouth portion, said wide mouthed container comprising a rib for preventing the deformation of the joint portion in stretching the body portion, integrally formed aslope onto a corner between the under surface of said joint portion at its external wall side and the inner surface of the external wall, a required number of the ribs provided in the lower annular groove at a regular interval.

2. An injection stretch blow molded wide mouthed container for a paint container and the like according to claim 1, wherein said container is molded in such a manner that an injection molded preform comprising a mouth portion of large diameter composed of an internal wall integral with a body portion having a bottom, an external wall of belt shape integrally formed on the outside of the internal wall via a joint portion of required width to be in H-shape, and an upper and lower annular grooves between both the walls sectioned by said joint portion, is held at said mouth portion provided by cooling and solidifying, and said body portion is stretch blown to the same level as said external wall while a portion from the underside of said internal wall to the body portion is in high temperatures.

3. An injection stretch blow molded wide mouthed container for a paint container and the like according to claim 2, wherein said preform comprises the body portion extending from said internal wall, the body portion is composed of a thick-walled planiform stretch expanded portion of corn shape and a recess of required inner diameter formed at the center of said preform by outwardly projecting a top portion of the stretch expanded portion; the bottom surface of the recess is formed to be nearly flat and thin; and the stretch expanded portion on the periphery of the recess is formed to curve inwardly.

4. An injection stretch blow molded wide mouthed container for a paint container and the like according to claim 1, wherein mounting holes are formed at symmetrical positions on the external wall in the molding of said preform; and fitting tabs projectingly provided on the inner sides of both end portions of a flexible corded handle are rotatably fitted and locked into the mounting holes respectively to mount said handle across both sides of an opening portion.

5. An injection stretch blow molded wide mouthed container for a paint container and the like according to claim 4, wherein said fitting tab is of tablet shape and comprises a semicircular locking block on the upside of the tip thereof; the end portions of the handle and the fitting tabs comprise a slit extending from the lower end to the central portion thereof; and the slits allow the end portions of the handle and the fitting tabs to be reduced in size to insert the fitting tabs along with the locking blocks into said mounting holes rotatably, so that said locking blocks are hooked and set inside the external wall.

6. An injection stretch blow molded wide mouthed container for a paint container and the like according to claim 1, said container further comprises a lid, wherein a projection for latching is projectingly provided on a rim of the lid, and is inserted into a fitting hole provided in a side surface of the external wall to close the lid, thereby preventing the lid from popping-out caused by a reaction in opening.

7. An injection stretch blow molded wide mouthed container for a paint container and the like according to claim 1, comprising a configuration in which: a rim of a lid of synthetic resins is formed largely in diameter to extend over a mouth end edge of the external wall and is shaped into a fitting groove so that the lid can be fitted both to the inner surface of the internal wall and to the mouth end edge of the external wall; an engaging edge is formed on the outside of the mouth end edge of the external wall; and a secondary fit provided between the engaging edge and an annular groove formed in the inside of said fitting groove prevents the lid from self-opening resulting from a looseness of the fitting with the inner surface of the mouth portion caused by the internal pressure of the container.

8. An injection stretch blow molded wide mouthed container for a paint container and the like according to claim 7, comprising an air vent provided in said external wall for discharging the gas leaked out on account of the loosened fit of said lid with the inner surface of the mouth portion so as to reduce the content of the paint container so that the sealing resulting from the fit with the inner surface of the mouth portion is restored.

* * * * *

UNITED STATES PATENT AND TRADEMARK OFFICE
CERTIFICATE OF CORRECTION

PATENT NO. : 6,179,158 B1
DATED : January 20, 2001
INVENTOR(S) : Hideaki Koda

It is certified that error appears in the above-identified patent and that said Letters Patent is hereby corrected as shown below:

Column 6,
Line 44, "he" should read -- the --; and

Column 7,
Line 56, "The." should read -- The --.

Signed and Sealed this

Twenty-fifth Day of December, 2001

*Attest:*

JAMES E. ROGAN
*Attesting Officer*   *Director of the United States Patent and Trademark Office*